US012654121B2

(12) United States Patent
Little et al.

(10) Patent No.: US 12,654,121 B2
(45) Date of Patent: Jun. 16, 2026

(54) AIR CLEANER BYPASS ASSEMBLY AND METHOD OF OPERATING

(71) Applicant: Donaldson Company, Inc., Bloomington, MN (US)

(72) Inventors: Dan Little, Minneapolis, MN (US); Scott M. Brown, Faribault, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 18/663,457

(22) Filed: May 14, 2024

(65) Prior Publication Data
US 2024/0293769 A1      Sep. 5, 2024

Related U.S. Application Data

(62) Division of application No. 17/599,897, filed as application No. PCT/US2020/023980 on Mar. 20, 2020, now Pat. No. 12,017,173.
(Continued)

(51) Int. Cl.
*B01D 45/16*          (2006.01)
*B01D 46/00*          (2022.01)
(Continued)

(52) U.S. Cl.
CPC ......... *B01D 46/0087* (2013.01); *B01D 45/16* (2013.01); *B01D 46/2411* (2013.01);
(Continued)

(58) Field of Classification Search
CPC ........................... B01D 46/0087; B01D 45/16; B01D 46/2411; B01D 46/446; B01D 50/20;
(Continued)

(56) References Cited

U.S. PATENT DOCUMENTS 3,411,272 A    11/1968   Carmon
3,449,891 A     6/1969   Shohet et al.
(Continued)

FOREIGN PATENT DOCUMENTS

CN        101990467        3/2011
CN        109404177        3/2019
(Continued)

OTHER PUBLICATIONS

International Search Report and Written Opinion for PCT/US2019/023980, mailed Jul. 15, 2020.

*Primary Examiner* — Dung H Bui
(74) *Attorney, Agent, or Firm* — Merchant & Gould P.C.

(57) ABSTRACT

An air cleaner assembly includes a precleaner assembly. In one aspect, the precleaner assembly incudes a bypass arrangement that is operated to bypass a portion of air around the precleaner assembly. The bypass arrangement can be operated by a controller based on at least one input signal corresponding to one or more of a vehicle speed, a vehicle engine speed, a vehicle engine load, an operator input, a vehicle location, an air pressure drop across a filter element, an air pressure drop across the precleaner assembly, an acoustic level, a vibration level, a change or cleaning frequency of the filter element, a total number of filter element changes, an identity of the filter element, an identity of the engine, an identity of the vehicle, an air flow rate through the precleaner assembly or through the filter element, and a weather condition parameter identified through data received locally or from a weather service.

18 Claims, 8 Drawing Sheets

Related U.S. Application Data

(60) Provisional application No. 62/826,357, filed on Mar. 29, 2019.

(51) Int. Cl.

| | |
|---|---|
| *B01D 46/24* | (2006.01) |
| *B01D 46/44* | (2006.01) |
| *B01D 50/20* | (2022.01) |
| *F02M 35/02* | (2006.01) |
| *F02M 35/022* | (2006.01) |
| *F02M 35/08* | (2006.01) |
| *B01D 46/52* | (2006.01) |

(52) U.S. Cl.
CPC .......... *B01D 46/446* (2013.01); *B01D 50/20* (2022.01); *F02M 35/0216* (2013.01); *F02M 35/0223* (2013.01); *F02M 35/082* (2013.01); *B01D 46/525* (2013.01)

(58) Field of Classification Search
CPC ...... B01D 46/525; B01D 45/12; B01D 46/44; F02M 35/0216; F02M 35/0223; F02M 35/082

See application file for complete search history.

(56) References Cited

U.S. PATENT DOCUMENTS

| | | | | |
|---|---|---|---|---|
| 3,483,676 | A | 12/1969 | Sargisson | |
| 4,242,115 | A | 12/1980 | Harold et al. | |
| 4,304,094 | A | 12/1981 | Amelio | |
| 4,348,057 | A | 9/1982 | Parenti et al. | |
| 4,514,193 | A * | 4/1985 | Booth | B01D 50/20 55/290 |
| 4,746,340 | A * | 5/1988 | Durre | B01D 45/12 55/347 |
| 5,472,463 | A | 12/1995 | Herman et al. | |
| 5,560,757 | A * | 10/1996 | Suzuki | B01D 46/0087 55/516 |
| 5,651,250 | A * | 7/1997 | Kawamura | B01D 39/2086 60/303 |
| 6,591,820 | B2 | 7/2003 | Kitano et al. | |
| 7,387,653 | B2 * | 6/2008 | Jacobson | B01D 45/12 55/343 |
| 7,802,433 | B2 | 9/2010 | Higgins | |
| 8,555,827 | B2 | 10/2013 | Schleiden | |
| 9,719,352 | B2 | 8/2017 | Sheoran et al. | |
| 10,100,734 | B2 | 10/2018 | Sheoran et al. | |
| 2004/0144698 | A1 * | 7/2004 | Hilpert | B01D 45/12 209/725 |
| 2008/0028940 | A1 | 2/2008 | Han et al. | |
| 2010/0086446 | A1 | 4/2010 | Matsunaga et al. | |
| 2010/0306955 | A1 | 12/2010 | Menrik et al. | |
| 2011/0030629 | A1 | 2/2011 | Schleiden | |
| 2011/0162354 | A1 | 7/2011 | Hayashi et al. | |
| 2011/0277441 | A1 | 11/2011 | Ayshford | |
| 2013/0092798 | A1 | 4/2013 | Boyce | |
| 2013/0239802 | A1 | 9/2013 | Troxell | |
| 2013/0263406 | A1 | 10/2013 | Amisami et al. | |
| 2014/0123621 | A1 | 5/2014 | Driessens et al. | |
| 2015/0033681 | A1 | 2/2015 | Santini et al. | |
| 2015/0114221 | A1 | 4/2015 | Ekanayake et al. | |
| 2015/0176545 | A1 | 6/2015 | Troxell et al. | |
| 2015/0275831 | A1 | 10/2015 | Chlystek et al. | |
| 2015/0345439 | A1 | 12/2015 | Gomez et al. | |
| 2016/0138507 | A1 | 5/2016 | Klassen et al. | |
| 2016/0160815 | A1 | 6/2016 | Martin et al. | |
| 2016/0245176 | A1 | 8/2016 | Sheoran et al. | |
| 2017/0203241 | A1 * | 7/2017 | Subedi | B01D 29/56 |
| 2017/0340996 | A1 | 11/2017 | Jo et al. | |
| 2018/0328320 | A1 | 11/2018 | Lecuelle | |
| 2019/0001250 | A1 | 1/2019 | Moredock et al. | |
| 2019/0255476 | A1 | 8/2019 | Silvestro et al. | |
| 2020/0121146 | A1 | 4/2020 | Ohlendorf | |
| 2020/0141338 | A1 | 5/2020 | Green | |
| 2020/0262560 | A1 * | 8/2020 | Hoang | B64D 11/02 |
| 2020/0269182 | A1 | 8/2020 | Gustavsson et al. | |
| 2020/0318585 | A1 | 10/2020 | Herman et al. | |
| 2020/0353400 | A1 * | 11/2020 | Schmidt | F16F 9/04 |
| 2020/0368664 | A1 | 11/2020 | Kroeger et al. | |
| 2022/0034245 | A1 | 2/2022 | Wang et al. | |

FOREIGN PATENT DOCUMENTS

| | | | | |
|---|---|---|---|---|
| FR | 2767872 | | 3/1999 | |
| FR | 2995632 | | 3/2014 | |
| FR | 2995632 | A1 * | 3/2014 | ......... F02M 35/0216 |
| JP | 2005163597 | | 6/2005 | |
| JP | 2007211605 | | 8/2007 | |
| WO | 2014210534 | | 12/2014 | |
| WO | 2016105560 | | 6/2016 | |

* cited by examiner

AIR CLEANER BYPASS ASSEMBLY AND METHOD OF OPERATING

RELATED APPLICATIONS

This application is a Divisional of U.S. patent application Ser. No. 17/599,897, filed Sep. 29, 2021, now U.S. Pat. No. 12,017,173; which is a National Stage Application of PCT International Application No. PCT/US2020/023980, filed Mar. 20, 2020; which claims the benefit of priority to U.S. Provisional patent application Ser. No. 62/826,357, filed Mar. 29, 2019; which applications are incorporated herein by reference. To the extent appropriate, a claim of priority is made to each of the above disclosed applications.

TECHNICAL FIELD

The present invention relates to filter arrangements, typically for use in filtering air, such as intake air for internal combustion engines, and more particularly relates to filter assemblies that include multiple components arranged in a housing to provide desired filtering capabilities.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example, on a vehicle, the filter media is contained in a removable and replaceable, i.e. serviceable, component, typically referred as a filter element or cartridge. In some applications, particularly where a machine operates in a harsh environment, a precleaner assembly can be utilized to remove relatively large contaminants from the airflow stream in order to extend the life of the filter media.

SUMMARY

An air cleaner assembly and method for operating the air cleaner assembly is disclosed. In one aspect, the air cleaner assembly includes a housing defining an inlet and an outlet, and including an access opening between the inlet and outlet. The air cleaner also includes a filter cartridge received within the housing and covering the access opening. The air cleaner also includes a precleaner assembly having at least one particle separator (e.g. a plurality of separator tubes) and having a bypass assembly that allows intake air to be partially bypassed around the separator tubes.

A method of operating a precleaner bypass system for an air cleaner assembly is also disclosed. The method can include the steps of providing a precleaner assembly including at least one particle separator for separating particulates from an airflow stream, providing a bypass assembly, wherein the bypass assembly is operable between a first state and a second state, the first state corresponding to a condition in which the entirety of the airflow stream is directed through the at least one particle separator, the second state corresponding to a condition in which at least a portion of the airflow stream bypasses the at least one particle separator, receiving, at a controller, at least one input for controlling the bypass assembly, wherein the at least one input signal corresponds to one or more of a vehicle speed, a vehicle engine speed, a vehicle engine load, an operator input, a vehicle location, an air pressure drop across a filter element, an air pressure drop across the precleaner assembly, an acoustic level, a vibration level, a change or cleaning frequency of the filter element, a total number of filter element changes, an identity of the filter element, an identity of the engine, an identity of the vehicle, an air flow rate through the precleaner assembly or through the filter element, and a weather condition parameter identified through data received from a weather service or local sensors, and operating the bypass assembly between the first and second states, with the controller, based on the at least one input.

In one example, the input includes a vehicle location input, wherein the controller operates the bypass assembly between the first and second states when the vehicle location input corresponds to a location inside or outside of a predetermined geographic area.

In one example, the input includes one or more of a vehicle speed, a vehicle engine speed, and a vehicle engine load input, wherein the controller operates the bypass assembly between the first and second states when the one or more of a vehicle speed, a vehicle engine speed, and a vehicle engine load exceeds a predetermined threshold In one example, the input includes an input corresponding to one or both of an air pressure drop across the precleaner assembly and the filter element, wherein the controller operates the bypass assembly between the first and second states when the air pressure drop exceeds or falls below a predetermined threshold.

In one example, the input includes an input corresponding to one or both of an acoustic input and a vibration input, wherein the controller operates the bypass assembly between the first and second states when the acoustic input or vibration input exceeds or falls below a predetermined threshold.

In one example, the input includes an input corresponding to one or both of a change or cleaning frequency of the filter element and a total number of filter element changes, wherein the controller operates the bypass assembly between the first and second states when the change or cleaning frequency input or the total number of filter element changes input exceeds or falls below a predetermined threshold.

In one example, the input includes an input corresponding to one or more of an identity of the filter element, an identity of the engine, and an identity of the vehicle, wherein the controller operates the bypass assembly to the first or second state based on the identity of one or more of the filter element, engine, and the vehicle.

In one example, the input includes an input corresponding to one or both of an air flow rate through the precleaner assembly and an airflow rate through the filter element, wherein the controller operates the bypass assembly between the first and second states when the air flow rate exceeds or falls below a predetermined threshold.

In one example, the input includes a weather condition parameter identified through data received from a weather service, wherein the controller operates the bypass assembly between the first and second states when the weather condition parameter exceeds or falls below a predetermined threshold.

In some examples, a precleaner assembly for an air cleaner assembly includes a partition wall, a plurality of separator tubes supported by and extending through the partition wall, and a bypass arrangement adjacent the plurality of separator tubes and operable between a first position and a second position. In the first position, an airflow stream flowing through the precleaner assembly flows in a first direction through one or both of the bypass region and the plurality of separator tubes in a first proportional relationship. In the second position, the airflow stream flows in the first direction through one or both of the plurality of separator tubes and the bypass region at a second proportional relationship different from the first proportional relationship.

In some examples, a precleaner assembly for an air cleaner assembly includes at least one particle separator, and a bypass arrangement operable between a first position and a second position. In the first position, an airflow stream flowing through the precleaner assembly flows in a first direction through one or both of the bypass region and the plurality of separator tubes in a first proportional relationship. In the second position, the airflow stream flows in the first direction through one or both of the plurality of separator tubes and the bypass region at a second proportional relationship different from the first proportional relationship. In one aspect, the airflow stream is received at the at least one particle separator and the bypass arrangement through a common air inlet.

In some examples, the second proportional relationship associated with the bypass arrangement second position includes all of the airflow stream flowing through the plurality of separator tubes with none of the airflow stream flowing through the bypass arrangement.

In some examples, the bypass arrangement includes one or more apertures disposed within the partition wall.

In some examples, the bypass arrangement includes a damper or gate controlled by an actuator.

In some examples, the bypass arrangement includes an electronic controller for commanding the actuator.

In some examples, the controller receives at least one input for controlling the position of the damper via the actuator, wherein the at least one input signal corresponds to one or more of vehicle speed, engine speed, engine load, an operator input, vehicle location, pressure drop across a filter element, mass air flow rate through the precleaner assembly, presence of moisture or water, vehicle or engine vibration, filter change frequency or number of filter changes, filter identity, and engine or vehicle identity.

In some examples, air flowing through the bypass arrangement flows in a direction that is parallel to a direction of air flowing through the separator tubes.

In some examples, an air cleaner assembly includes a housing body having an inlet end and an outlet end, the housing body defining an interior cavity, a filter media disposed within the interior cavity, a precleaner assembly mounted to the inlet end of the housing body. The precleaner assembly can include a partition wall, a plurality of separator tubes supported by and extending through the partition wall, and a bypass arrangement adjacent the plurality of separator tubes and operable between a first position and a second position. In the first position, an airflow stream flowing through the precleaner assembly flows in a first direction through one or both of the bypass region and the plurality of separator tubes in a first proportional relationship. In the second position, the airflow stream flows in the first direction through one or both of the plurality of separator tubes and the bypass region at a second proportional relationship different from the first proportional relationship.

In some examples, the second proportional relationship associated with the bypass arrangement second position includes all of the airflow stream flowing through the plurality of separator tubes with none of the airflow stream flowing through the bypass arrangement.

In some examples, the bypass arrangement includes one or more apertures disposed within the partition wall.

In some examples, the bypass arrangement includes a damper or gate for controlling flow through the bypass arrangement.

In some examples, the bypass arrangement further includes a controller that receives at least one input for controlling the position of the damper via the actuator, wherein the at least one input signal corresponds to one or more of vehicle speed, engine speed, engine load, an operator input, vehicle location, pressure drop across a filter element, mass air flow rate through the precleaner assembly, presence of moisture or water, vehicle or engine vibration, filter change frequency or number of filter changes, filter identity, and engine or vehicle identity.

In some examples, air flowing through the bypass arrangement flows in a direction that is parallel to a direction of air flowing through the separator tubes and is parallel to a direction of air flowing through the filter media.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Herein, example filter assemblies, filter cartridges, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

Figure 1:
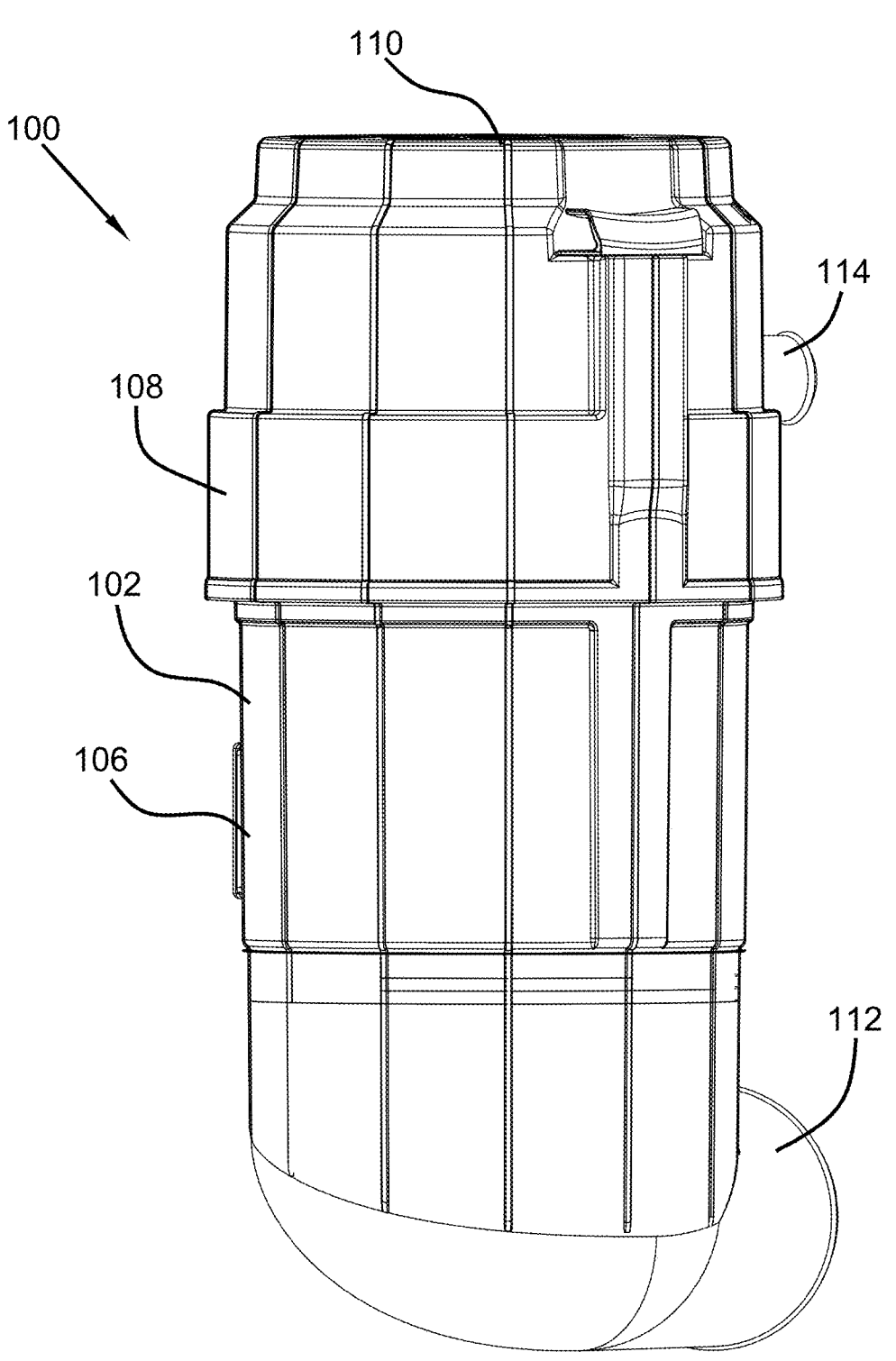
FIG. 1 is a side view of an air cleaner having features in accordance with the present disclosure.
Figure 2:
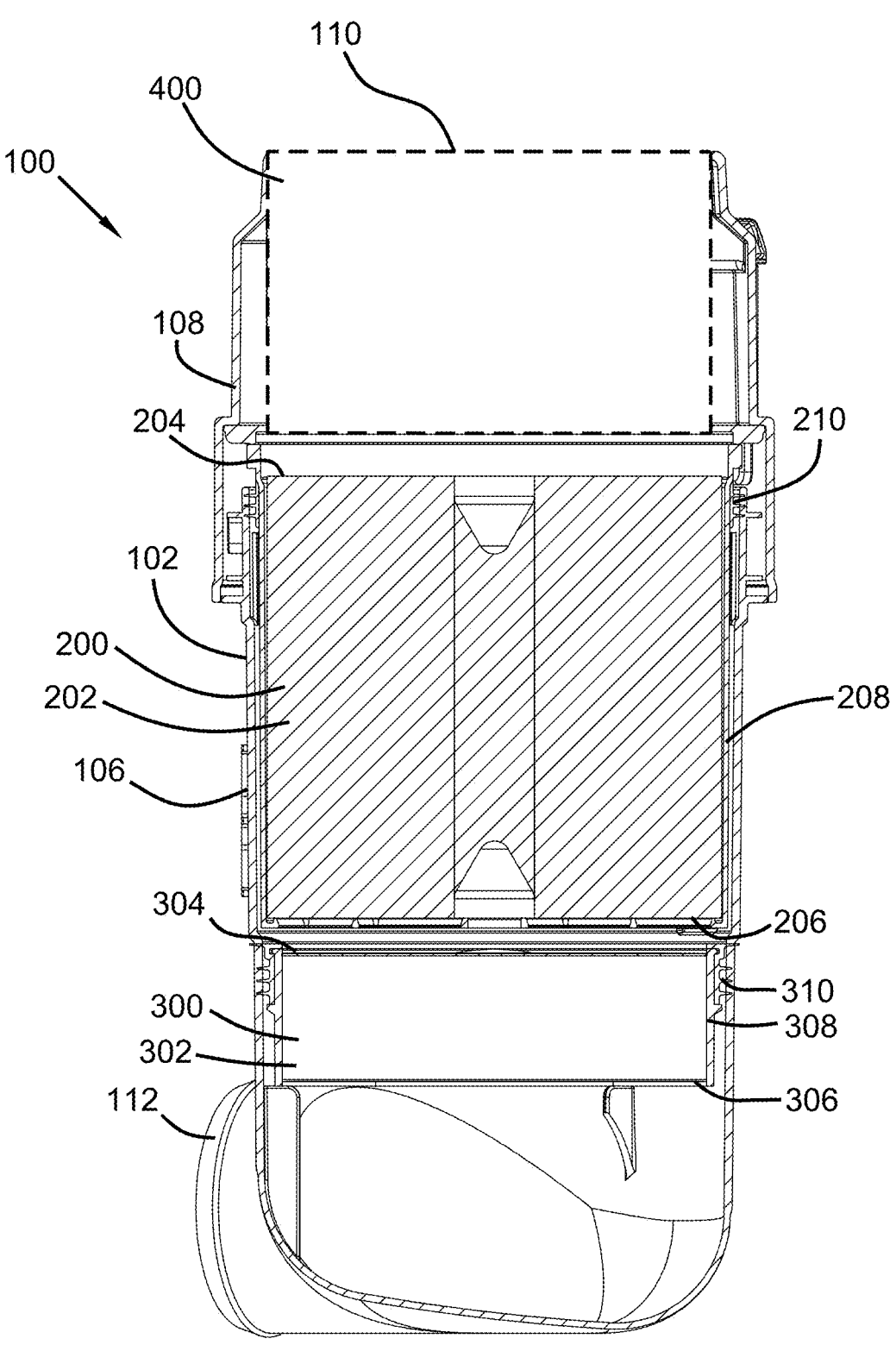
FIG. 2 is a cross-sectional side view of the air cleaner shown in FIG. 1.

Referring to FIGS. 1 and 2, an air cleaner assembly 100 is presented. In one aspect, the air cleaner assembly 100 includes a housing 102 defining an interior cavity 104. The housing 102 can be configured as a main housing 106 and a cover 108 that allow for the interior cavity 104 to be accessed when the cover 108 is removed from the housing 106. The cover 108 can be secured to the housing 106 using any number of methods or approaches known in the art, for example by over-center latches, interacting lugs, and the like. In one aspect, the housing 102 includes an inlet 110 for accepting raw, untreated air and an outlet 112 for discharging clean, filtered air.

Referring to FIG. 2, a first filter cartridge 200, a second filter cartridge 300, and a precleaner assembly 400 are shown within the internal cavity 104 of the housing 102. These components collectively convert the unfiltered air received at the inlet 110 to the clean, filtered air delivered to the outlet 112.

In one aspect, the first filter cartridge 200 is generally positionable between the precleaner assembly 400 and the second filter cartridge 300. In a typical arrangement, the first filter cartridge 200 is removably positioned within the air cleaner assembly interior cavity 104, and would typically be considered to be a service component that is removable and replaceable, as desired and/or necessary. In one aspect, the first filter cartridge 200 includes a media pack 202 having an inlet flow face 204 for receiving pre-cleaned air from the precleaner assembly 400 and an outlet flow face 206 for delivering filtered air. In the example shown, the media pack 202 has a round cross-sectional shape. However, other shapes are possible, such as obround, oval, and rectangular cross-sectional shapes. In one aspect, the media pack 202 defines an outer perimeter 208 extending between the inlet and outlet flow faces 204, 206. In the example shown, the media pack 202 is formed from a coiled media construction, for example a media construction having a fluted (typically corrugated) media sheet and a facing media sheet that together define parallel flutes to form a fluted or z-filter media construction. Suitable media constructions for the media pack 202 are discussed in more detail in the Media Types and Configurations section. In one aspect, the filter cartridge 200 includes a seal member 210 which forms a seal against an interior surface of the housing 102 such that all air passing through the interior cavity must pass through the media pack 202.

In one aspect, the second filter cartridge 300 is generally positionable between the outlet 112 and the first filter cartridge 200. In a typical arrangement, the second filter cartridge 300 is removably positioned within the air cleaner assembly interior cavity 104, and would typically be considered to be a service component that is removable and replaceable, as desired and/or necessary. In one aspect, the second filter cartridge 300 includes a media pack 302 having an inlet flow face 304 for receiving air from the first filter cartridge 200 and an outlet flow face 306 for delivering filtered air to the outlet 112. In the example shown, the media pack 302 has a round cross-sectional shape. However, other shapes are possible, such as obround, oval, and rectangular cross-sectional shapes. In one aspect, the media pack 302 defines an outer perimeter 308 extending between the inlet and outlet flow faces 304, 306. In the example shown, the media pack 302 is formed from pleated media. Suitable media constructions for the media pack 302 are discussed in more detail in the Media Types and Configurations section. In one aspect, the filter cartridge 300 includes a seal member 310 which forms a seal against an interior surface of the housing 106 such that all air passing through the interior cavity must pass through the media pack 302.

Figure 3:
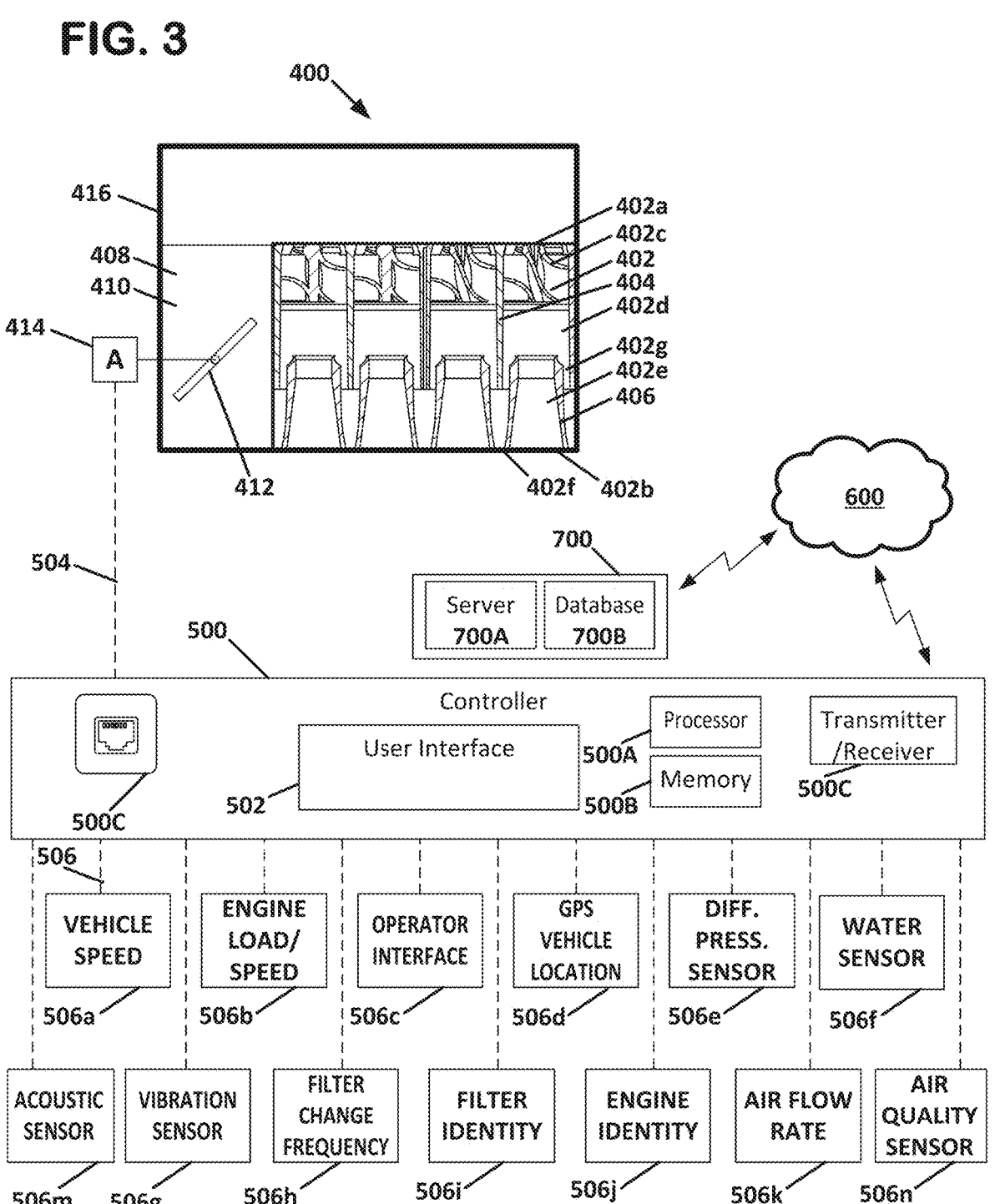
FIG. 3 is a schematic of a control system for operating a precleaner of the air cleaner shown in FIG. 1.

Referring to FIGS. 2 and 3, the precleaner assembly 400 is shown as being a two-stage air cleaner assembly, and includes a plurality of separator tube arrangements 402. The precleaner assembly 400 is usable to preclean selected material (contaminant) carried by an air stream into the air cleaner assembly 100, before the air reaches the first filter cartridge 200 positioned therein. Such precleaning generally leads to substantial removal of liquid particulate such as rain water or splashed water, etc. and/or various (especially larger) dust or other particles. In the example shown, contaminants removed by the precleaner assembly 400 can be discharged from the interior cavity 104 though an ejection port 114 extending through the housing 102. In some examples, the precleaner assembly 400 comprises a portion of the access cover 108.

In the example shown, the precleaner assembly 400 comprises two shell or cover components secured to one another: an outer (inlet) cover portion 404 and an inner (outlet tube) cover portion 406. In some applications characterized herein, the components 404, 406 are snap-fit or otherwise secured together, but configured to be separable to facilitate cleaning. However, in some applications of the techniques characterized herein, the two covers or shell components 404, 406 can be secured together during assembly, and not be separable again.

As stated previously, the precleaner assembly 400 can be provided with a plurality of separator tube arrangements 402. As most easily seen at FIG. 3, each of the separator tube arrangements 402 can be provided with an inlet end 402a and an outlet end 402b. Proximate the inlet end 402a, each of the separator tube arrangements 402 is provided with a vane arrangement 402c located within an inlet flow tube 402d that extends in a direction towards the outlet end 402b. As presented, the vane arrangements 402c and inlet flow tubes 402d are integrally formed within the outer cover 404. However, these components may be alternatively provided separately and later attached to the outer cover 404, such as by press-fitting. In the example presented, the inlet inner cover 406 includes a plurality of outlet flow tubes 402e projecting from a tube sheet 402f. Each of the outlet flow tubes 402e projects towards the inlet end 402a and partially receives an inlet flow tube 402d, wherein an annulus or gap 402g exists between the inlet and outlet flow tubes 402d.

The general operation of the precleaner assembly 400, again, is to separate material (contaminant) upon entering into the air cleaner assembly 100 to allow for evacuation through outlet port 114 in the housing 102. This inhibits certain materials from ever reaching the internally received filter cartridge componentry (e.g. filter cartridges 100, 200). In general, each tube 402 operates with a centrifugal separation of contaminant conducted internally. To accomplish this, the air entering the inlet ends 402*a*, as generally directed into a cyclonic pattern by the vanes of the vane arrangement 402*c*. Due to this action, contaminants are forced against the inlet flow tubes 402*d* and are ultimately ejected through port 114. As the inlet ends of the outlet flow tubes 402*e* are located within the outlet ends of the inlet flow tubes 402*d*, the contaminants which are able to be separated and forced against the inner walls of the inlet flow tubes 402*d* are unable to enter the outlet flow tubes 402*e*. The tube sheet 402*f* blocks airflow between the inner cover 406 and the downstream portions of the air cleaner assembly 100 such that all air separated by the air separator tubes 402 must be directed through the outlet flow tubes 402*e*. An exemplary separator tube arrangement usable with the disclosed systems herein is shown and described in PCT International Patent Application Publication Number WO 2016/105560, filed on Dec. 23, 2015, the entirety of which is incorporated by reference herein. Alternative arrangements exist.

Although directing air through the separator tubes 402 is useful for separating contaminants, an operating cost exists in terms of the resulting pressure drop as the air passes through the separator tubes 402. As such, the use of a precleaner assembly 400 generally decreases fuel efficiency and engine performance. To offset some of these operating costs under conditions where it is unnecessary to separate contaminants at the level achieved with full airflow through the separator tubes 402, the precleaner assembly 400 is also provided with a bypass arrangement 408. In one aspect, the bypass arrangement 408 includes a bypass passageway 410 that allows air to pass from the inlet 110 to the first filter cartridge 200 without passing through the separator tubes 402. In the configuration shown, the bypass passageway 410 is parallel to the air flow path defined by the separator tubes 402 and is axially aligned with the air entering the inlet 110. As such, air can pass through the bypass passageway 410 without changing direction between the inlet 110 and the inlet flow face 204 of the media pack 202 and therefore minimizing pressure drop through the bypass passageway 410. As such, the bypass passageway 410 can be characterized as being arranged in parallel to the separator tubes 402.

In one aspect, a damper 412 is provided within the bypass passageway 410 and is operable between an open position in which airflow can pass through the bypass passageway 410 and a closed position in which airflow is blocked from flowing through the bypass passageway 410. When the damper 412 is in the open position, or at least is not in the closed position, air entering the inlet 110 passes through bypass passageway 410 and therefore lowers the airflow through the separator tubes 402. The proportion of air flowing through the separator tubes 402 and the bypass passageway 410 is a function of the position of the damper 412 and the relative pressure drop induced by the damper 412 through the bypass passageway 410. Thus, a desired proportion of airflow flowing through the separator tubes 402 relative to the airflow flowing through the bypass passageway 410 can be controlled by the position of the damper 412. When the damper 412 is in the completely closed position, no airflow can flow through the bypass passageway 410 such that all air entering the inlet 110 must pass through the separator tubes 402. Although a damper 412 is shown, other devices for controlling airflow through the bypass passageway 410 may be utilized. For example, a gate type arrangement may be used.

In one example, the position of the damper 412 is controlled via an actuator 414. However, it is noted that an actuator can be omitted and the damper 412 set in a fixed position where it is not desired to change or further control the proportion of airflow through the bypass passageway and the separator tubes 402. In one example, the actuator 414 can be a mechanical actuator that is connected to an operator interface such as a linkage arm, lever, or button such that an operator can physically move the damper to a desired position. The actuator 414 can also be a mechanical actuator controlled by mechanical linkages, pneumatics or hydraulics through the use of an input device (e.g., air cleaner restriction vacuum connected to pneumatic actuator). In such a configuration, the operator could initiate movement of the damper 412 via an input or the damper 412 could be moved via a controller with a suitable electro-mechanical interface present. In the example shown at FIG. 3, the actuator 414 is an electric actuator connected to the damper 412 via a linkage. In such an application, the actuator 414 can be a motorized actuator or a solenoid-based actuator. In the example shown, the actuator 414 is controlled via an electronic controller 500 that commands the actuator 414 to a desired position.

With continued reference to FIG. 3, the electronic controller 500 is schematically shown as including a processor 500A and a non-transient storage medium or memory 500B, such as RAM, flash drive or a hard drive. Memory 500B is for storing executable code, the operating parameters, and the input from the operator user interface 502 while processor 500A is for executing the code. The electronic controller is also shown as including a transmitting/receiving port 500C, such as an Ethernet port for two-way communication with a WAN/LAN related to an automation system. A user interface 502 may be provided to activate and deactivate the system, allow a user to manipulate certain settings or inputs to the controller 500, and to view information about the system operation.

The electronic controller 500 typically includes at least some form of memory 500B. Examples of memory 500B include computer readable media. Computer readable media includes any available media that can be accessed by the processor 500A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 500A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The electronic controller 500 is also shown as having a number of inputs/outputs that may be used for operating the precleaner bypass assembly 408. For example, as mentioned previously, the damper actuator 414 can receive an output 504 from the controller 500. Examples of inputs or operational parameters 506 that could be received by the controller 500 are vehicle speed 506*a*, engine speed 506*b*, operator interface signals 506*c*, vehicle location 506*d* (e.g. GPS location input via integrated GPS unit or via vehicle GPS unit), differential pressure signal 506*e* (e.g. across filter cartridge 100), water presence signal 506*f*, vehicle, engine, or air cleaner assembly vibration signal 506*g* (e.g. accelerometer input), filter cartridge change or cleaning frequency 506*h*, filter cartridge identity 506*i*, engine identity 506*j*, air flow rate 506*k*, acoustic levels via an acoustic sensor 506*m* (use as a proxy for vibration), and/or air quality input 506*n* via a particulate sensor (e.g. laser real-time optical particle counter). The controller 500 can also include additional inputs and outputs for desirable operation of the precleaner bypass arrangement and related systems. For example, additional input sensors relating to weather data can be included, such as, temperature sensors, humidity sensors, barometric pressure sensors, moisture or rain sensors, wind direction and velocity sensors, cloud sensors, and/or solar radiation sensors in communication with the controller 500. In some examples, the electronic controller 500 is an independent controller that communicates with the vehicle controller, for example via the CANBUS network. In such cases, additional vehicle information can be utilized by the controller, beyond that already discussed, can be used as inputs to the controller, for example, vehicle fuel economy. In some examples, the vehicle control system serves as the electronic controller 500.

In one example of an operational configuration, the actuator 414 is controlled via an input related to the location of the vehicle or machine (e.g. input 506*d*). The location input 506*d* can provide an indication as to the environment within which the vehicle or machine may be present. For example, a location input 506*d* corresponding to an on-road (e.g. highway) location would provide an indication that the intake air is relatively clean while a location input 506*d* corresponding to an off-road location would provide an indication that the intake air is relatively full of contaminants. Also, some geographical areas or regions may be associated with air that is relatively more full of contaminants in comparison to other geographical areas or regions. Thus, where a location input 506*d* is provided indicating a relatively clean environment, the actuator 414 can position the damper to an open position such that some of the intake air can bypass the separator tubes 402 and thus increase engine efficiency. In one example, the location input 506*d* can used in conjunction with a date input to identify when a climate in a particular area may be associated with higher contaminant levels (e.g. a potentially high-contaminant condition can be identified by correlating a specified geographical area against certain days or months of the year (e.g. to identify high pollen conditions).

Many other implementations and control configurations are possible. For example, the vehicle speed (e.g., mph via GPS) input 506*b* and/or the engine speed or load input 506*b* can be used to infer whether a relatively high or low contaminant condition exists. In one example, the engine speed or load input 506*b* is used to command the damper 412 open via the actuator 414 to reduce parasitic losses from the air cleaner 100 when the engine is at high load and/or at high speeds. In one example, the differential pressure input 506*e* can be to infer the current operational condition of the precleaner, the filter cartridge 100, and/or the filter cartridge 200, whereby the actuator 414 can be commanded to open the damper 412 to extend the operating window by reducing pre-cleaner restriction contribution towards end of life when flow rates are high. Additionally, the system can monitor the rate of change of the pressure drop across the filter to identify conditions for bypass operation as well. In one example, the moisture or water presence sensor input 506*f* can be used where the precleaner acts as a water separator. In such a case, the moisture sensor 506*f* input can be used to set a bypass flow such that flow through the separator is optimized for water removal. In one example, an air mass flow rate input 506*k* can be used to extend the operating window by opening the damper 412 when air flow rates are high to extend the operating window by reducing precleaner restriction contribution towards end of life. In one example, the air flow rate can be correlated to pressure drop or restriction through the air cleaner such that restriction with respect to flow can be normalized to find the system loss coefficients which can then be monitored for a rate of change to infer the contaminant load coming into the filter, which can then be used to adjust the precleaner bypass flow amount (e.g., low rate of change equals more bypass allowed). In one example, a vibration or accelerometer input 506*g* can be used to infer the operation condition of the machine or vehicle (e.g., high vibrations can correlate to off-road use and environment while low vibrations can correlate to on-road use and environment and to thus control the position of the damper 412. Similarly, an acoustic sensor input 506*m* can be used to estimate vibration for the same purpose. The controller 500 can also monitor the number of installation and removal cycles for the filter cartridge 100 via an input 506*h*. When the filter cartridge 100 is being cleaned frequently, the amount of precleaner usage can be reduced by opening the bypass damper 412 which can drive incentive to change the element and reduce restriction (and improves fuel economy) on a system where the filter cartridge 100 is being cleaned frequently (e.g., daily) regardless of the condition of the filter cartridge 100. The identity of the filter cartridge 100 via an input 506*i* can also be used to determine the type of filter cartridge installed and thus modify the position of the damper 412 accordingly. For example, the damper 412 can be controlled for low initial precleaning (i.e., damper 412 opened) on certain elements (e.g., Donaldson non-ultraweb elements) to reduce the time the element spends in the initial low efficiency state or on non-genuine elements to reduce the time spent with lower quality or improper fit elements. This type of control can be based on the concept that dust from a lower efficiency separator will be easier for the primary element (e.g., filter cartridge 100) to capture because of the particle size, therefore reducing what is passed through the primary. In one example, the input 506*i* can be an RFID tag on the filter element that is read by the controller 500. The system can also have an input 506*n* for an air quality sensor to measure particulate levels in the air such that precleaning can be initiated for when high levels of particulate are measured and bypass operation can be initiated during low levels of particulate in the air.

In some operational configurations, the actuator 414 operates the position of the damper 412 in an incremental fashion. In one example, the damper 412 can have multiple discrete settings, as set directly by an operator (e.g., "dirty", "mixed", and "clean" settings). The above-described inputs can also be compared against predetermined thresholds set within the controller 500 to select between a fixed number of levels (e.g., "Dirty", "Mixed", "Clean" settings) in order to set the position of the bypass damper 412. In one example, the bypass position of the damper 412 can be calculated based on a formula using the inputs above (e.g., Bypass %=a*Vehicle Speed-b). Use characteristics of the air cleaner can also be utilized to determine bypass amounts and trigger levels. For example, precleaner efficiency can be plotted against the additional restriction of reduced bypass. Through the use of such a map, systems with a large loss in efficiency for an increment of additional restriction would want to trigger later or in cleaner environments than systems with only a minor decrease in efficiency for an increment of additional restriction. Incremental bypass could also be used to "tune" the total system. For instance, a given on-road truck model may have four different engine options and the possibility of being considered a light duty or a heavy duty (vocational) truck. All of these trucks would still use the same air cleaner and those applications that are more extreme would see a lower performance vs those that have a lighter duty or less severe environment. Having an adjustable pre-cleaner could level the performance differences and may impact how the air cleaner is design from the start. In such cases, an engine identity input 506j could be used for this determination. In some examples, the actuator 414 is a fully modulating actuator which can be place the damper 412 in any desired partially open/closed position.

In some examples, the controller 500 and/or the vehicle control system in communication with the controller 500 can be configured with a wireless receiver/transmitter 500C for to enable remote communication between the controller 500 and other systems. With such a configuration, the controller 500 can be adapted to receive additional information or data for controlling the bypass actuator 414. In one example, the controller 500 can be configured to receive real-time and forecast weather data weather data APIs via the cloud 600, and then operate the bypass actuator 414 during weather and atmospheric conditions corresponding to low particulate matter or higher air quality conditions (e.g. low pollen, dust, etc.). However, and as related previously, atmospheric or weather conditions can be also be assessed from local sensors onboard the vehicle. For example, atmospheric or weather conditions can be determined via input from temperature sensors, humidity sensors, barometric pressure sensors, moisture or rain sensors, wind direction and velocity sensors, cloud sensors, and/or solar radiation sensors in communication with the controller 500. In some examples, locally received atmospheric and weather data (via sensors) and remotely received atmospheric and weather data may be used by the controller 500 to control the bypass arrangement 408.

In one aspect, the wireless receiver/transmitter 500C can also be placed in communication with a remote system 700 (e.g. a server 700A and database 700B) which can be configured to perform some or all of the aforementioned logic functions previously ascribed to the controller 500. The controller 500 can also send current or recorded operational data to the remote system 700 for archiving. The controller 500 and remote system 700 can also be configured to allow for control algorithms stored on the controller 500 to be implemented and/or updated via the remote server 700. In one example, the remote system 700 can be placed in communication with multiple controllers 500 such that the performance of multiple systems can be simultaneously monitored and evaluated. The remote system 700 can use individual or aggregated controller data to optimize the control algorithms and/or operational set points used by the controller(s) 500. In one example implementation, a fleet operator can develop an operation policy which is pushed out to the controllers 500 of all vehicles within the fleet via the remote system 700. One example policy would be that the bypass arrangement 408 is to be set to the bypass mode (i.e. first damper position) for all vehicles until the bypass mode is overridden. The policy can include instructions for the controller to override the bypass mode into the precleaner mode (i.e. second damper position) under certain conditions (e.g. as previously described) and/or can include a remote override that enables the fleet operator to selectively place the precleaner assemblies into the precleaner mode based on the identification of a condition that would benefit from closing the bypass (e.g., forecast dust storm, change in the use of fleet vehicles to a more dusty environment, etc.). The remote system 700 can also be configured to provide a fleet owner with the current operating status of each bypass arrangement associated with a vehicle and to provide the fleet owner with the ability to directly override the commanded position of the bypass arrangement 408 by the controller 500.

Figure 4:
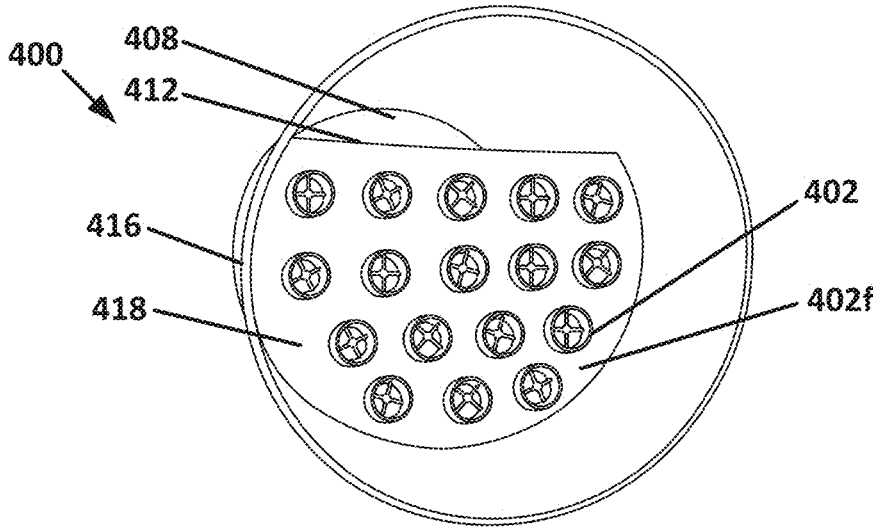
FIG. 4 is a perspective view of a precleaner assembly having features in accordance with the present disclosure usable with the air cleaner shown in FIG. 1.
Figure 5:
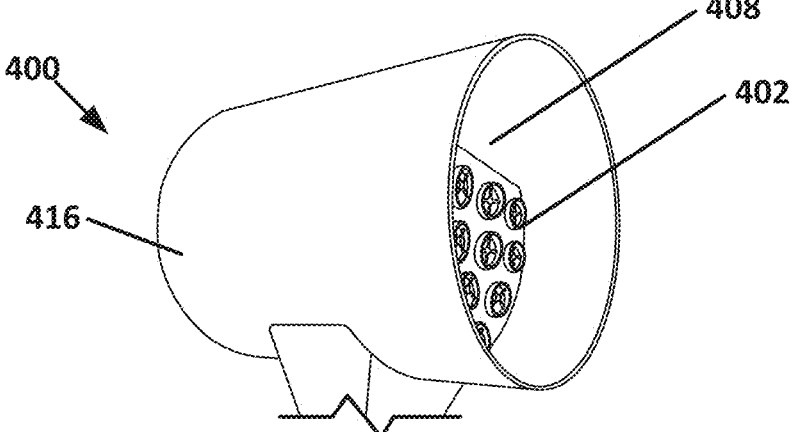
FIG. 5 is a perspective view of the precleaner assembly shown in FIG. 4.
Figure 6:
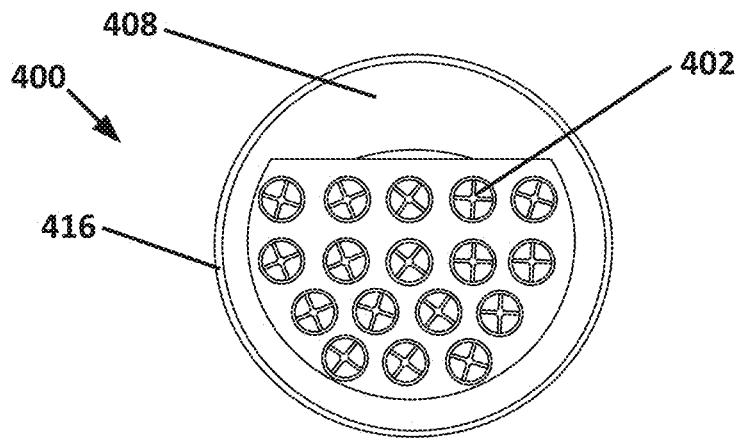
FIG. 6 is an end view of the precleaner assembly shown in FIG. 4.

Referring to FIGS. 4 to 6, a physical example precleaner assembly 400 is shown having an outer housing wall 416 that defines an interior cavity 418. In this example, 17 separator tubes 402 are provided while a single bypass passageway 410 with a damper 412 is provided adjacent the separator tubes 402. However, fewer or more of separator tubes 402 may be used. More than one bypass passageway 410 may also be used. In the example shown, the outer housing wall 416 is circular and the bypass passageway 410 and damper 412 are shaped as a sector of the circular shape. However, other shapes are possible such as obround, oval, and rectangular cross-sectional shapes.

Referring to FIGS. 7-12 test data using the precleaner assembly 400 shown in FIGS. 4-6 is presented. In an unexpected but critical aspect of utilizing a bypass assembly is that while the bypass assembly is open, a significant precleaner efficiency with relative minimal restriction relative to a baseline condition (e.g. a system with no precleaner) still results. For example test results show that allowing some air to pass through the bypass assembly reduced pressure drop across the precleaner to drop to only 0.6 inches water column (w.c.) while still maintaining a 50% pre-cleaner efficiency for coarse dust, which lead to a 58% increase in dust fed to the system. As such, even where a significant amount of air is being bypassed around the precleaner tubes 502, a significant amount of dust is still prevented from reaching the filter cartridge 100 at minimal system cost (e.g. pressure drop through the system).

Figure 7:
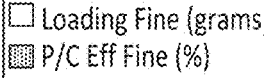
FIG. 7 is a graphical representation of fine dust performance of the precleaner assembly shown in FIG. 4.
Figure 7:
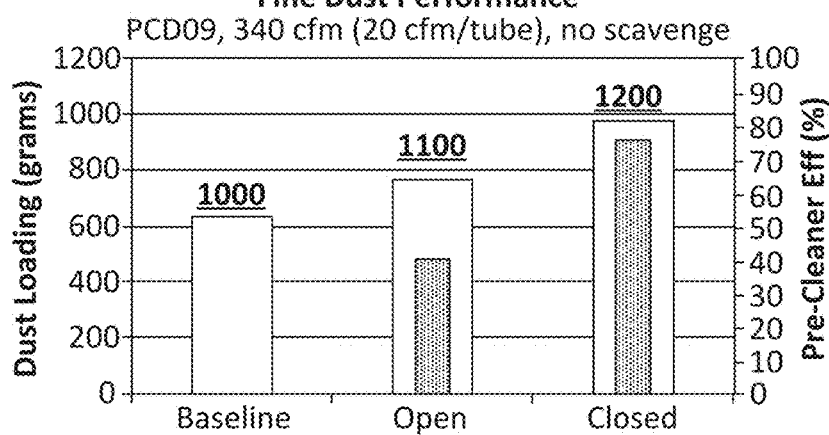
Figure 10:
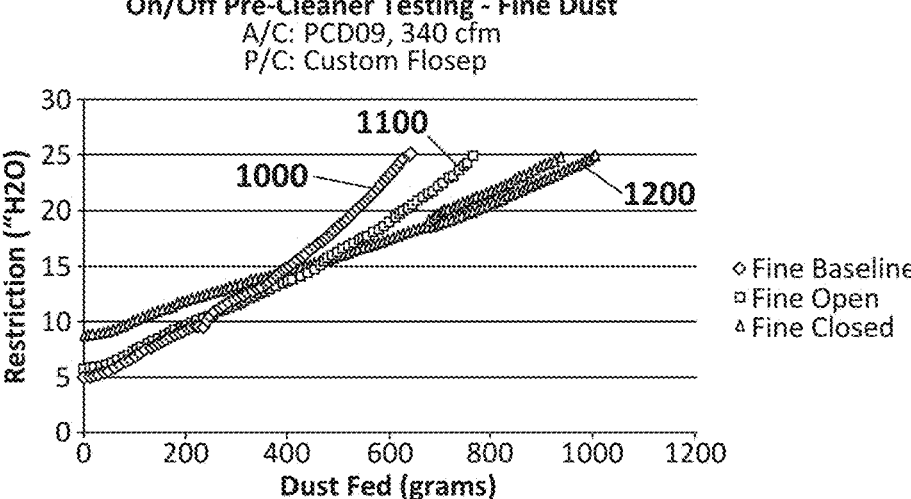
FIG. 10 is a graphical representation of on/off fine dust performance of the precleaner assembly shown in FIG. 4.

FIGS. 7 and 10 show testing results for a fine dust performance test in which 340 cfm (20 cfm per tube) was used with FIG. 7 showing dust loading and pre-cleaner efficiency and FIG. 10 showing restriction against dust fed into the test system. The depicted "baseline" condition 1000 shows dust loading of a test filter cartridge in grams for an air cleaner assembly without the precleaner assembly 400 installed. Test results showed dust loading of just above 600 grams for the test at a final restriction of about 25 inches w.c. The depicted "open" condition 1100 corresponds to the damper 412 being in the fully open position and shows dust loading of just above 800 grams at a final restriction of about 25 inches w.c. with a precleaner dust removal efficiency of about 40%. The depicted "closed" condition 1200 corresponds to the damper 412 being in the fully closed position and shows dust loading of about 1,000 grams at a final restriction of about 25 inches w.c. with a precleaner efficiency of about 75%. As such, while use of the precleaner bypass results in decreased loading performance of the test filter, a significant improvement over the baseline condition still results which corresponds to extending the service life of the filter cartridge in fine dust conditions.

Figure 8:
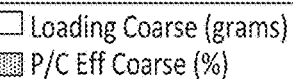
FIG. 8 is a graphical representation of coarse dust performance of the precleaner assembly shown in FIG. 4.
Figure 8:
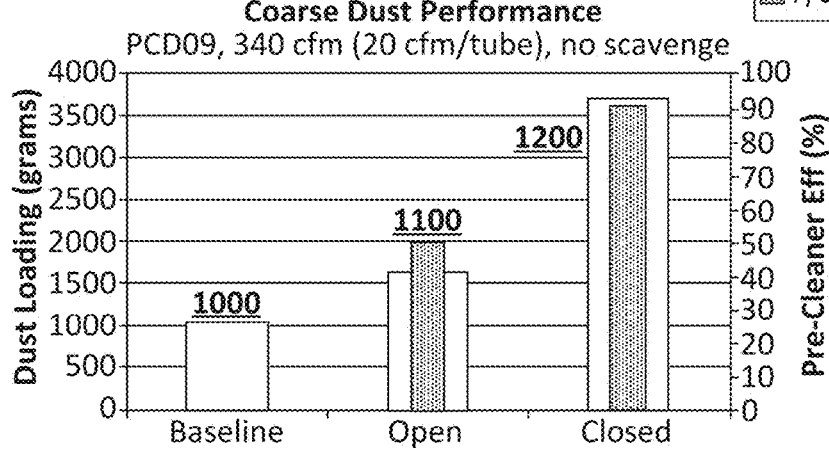
Figure 11:
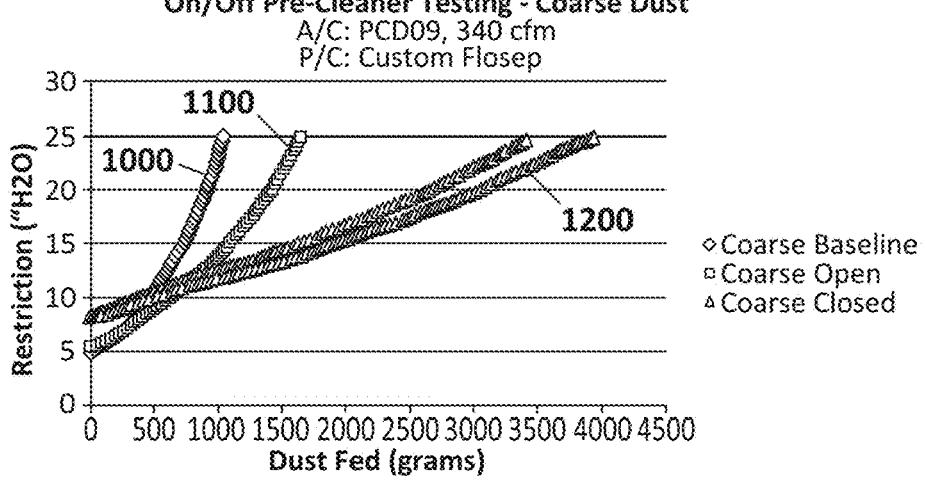
FIG. 11 is a graphical representation of on/off coarse dust performance of the precleaner assembly shown in FIG. 4.

FIGS. 8 and 11 show testing results for a coarse dust performance test in which 340 cfm (20 cfm per tube) was used with FIG. 8 showing dust loading and pre-cleaner efficiency and FIG. 11 showing restriction against dust fed into the test system. The depicted "baseline" condition 1000 shows dust loading of a test filter cartridge in grams for an air cleaner assembly without the precleaner assembly 400 installed. Test results showed baseline dust loading of about 1000 grams at a final restriction of about 25 inches w.c. The depicted "open" condition 1100 corresponds to the damper 412 being in the fully open position and shows dust loading of about 1,600 grams at a final restriction of about 25 inches w.c. with a precleaner dust removal efficiency of about 50%. The depicted "closed" condition 1200 corresponds to the damper 412 being in the fully closed position and shows dust loading of about 3,700 grams at a final restriction of about 25 inches w.c. with a precleaner efficiency of about 90%. As such, while use of the precleaner bypass results in decreased loading performance of the test filter, a significant improvement over the baseline condition still results which corresponds to extending the service life of the filter cartridge in coarse dust conditions.

Figure 9:
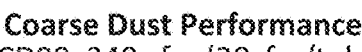
FIG. 9 is a graphical representation of initial restriction performance of the precleaner assembly shown in FIG. 4.
Figure 9:
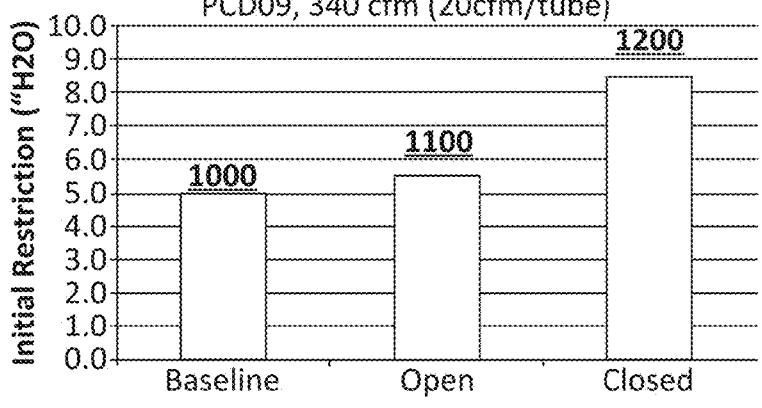

FIG. 9 shows testing results for airflow restriction through the system in which 340 cfm (20 cfm per tube) showing initial airflow restriction. The depicted "baseline" condition 1000 corresponds to the air cleaner assembly without the precleaner assembly 400 installed and shows an initial restriction of about 5 inches w.c. The depicted "open" condition 1100 corresponds to the damper 412 being in the fully open position and shows a restriction of about 5.6 inches w.c. The depicted "closed" condition 1200 corresponds to the damper 412 being in the fully closed position and shows a restriction of about 8.5 inches w.c. Thus, it can be seen that the aforementioned performance of the precleaner in the fully open bypass condition in comparison to the baseline condition is achieved at a very minimal cost in terms of incremental pressure drop.

Figure 12:
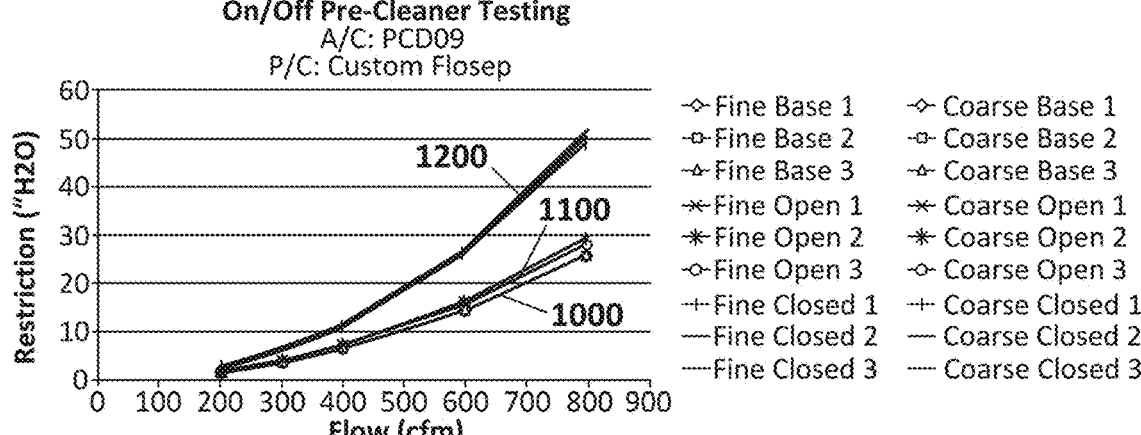
FIG. 12 is a graphical representation of on/off total performance of the precleaner assembly shown in FIG. 4.

FIG. 12 shows multiple testing results for restriction in comparison to flow (cfm) for the baseline configuration 1000, for the fine dust configuration 1100, and the coarse dust configuration 1200. These test results are consistent with the aforementioned test results and further illustrate the advantage of providing partial precleaning in view of the minimal pressure drop cost.

Figure 13:
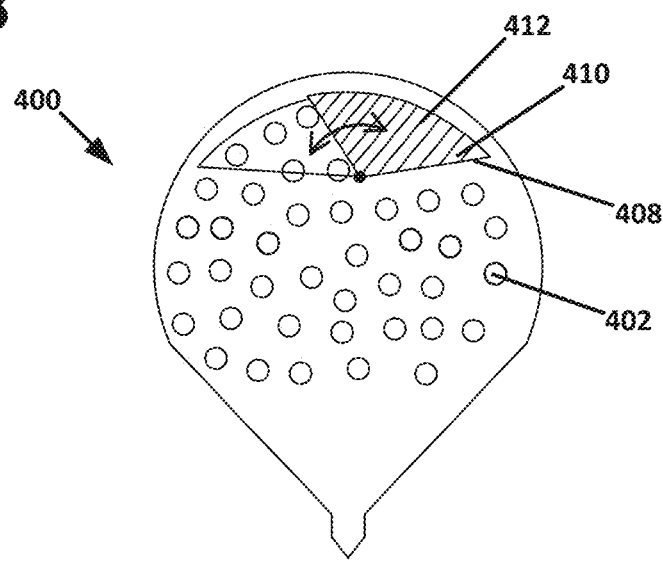
FIG. 13 is a schematic representation of a second example of a precleaner assembly in accordance with features of the present disclosure.
Figure 14:
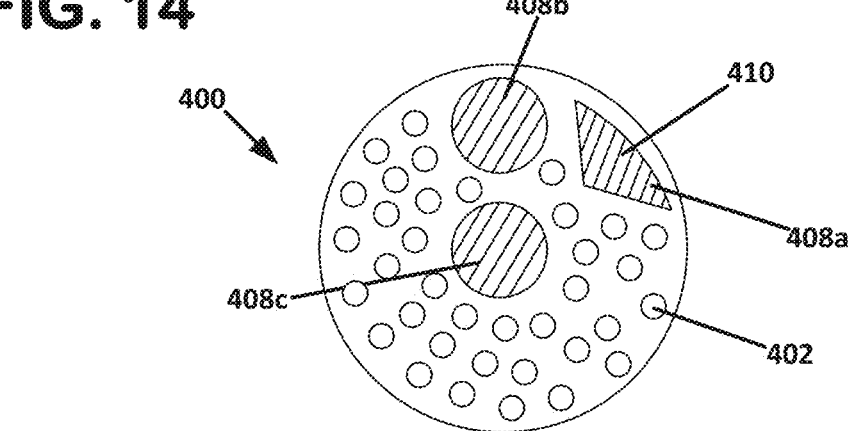
FIG. 14 is a schematic representation of a third example of a precleaner assembly in accordance with features of the present disclosure.
Figure 15:
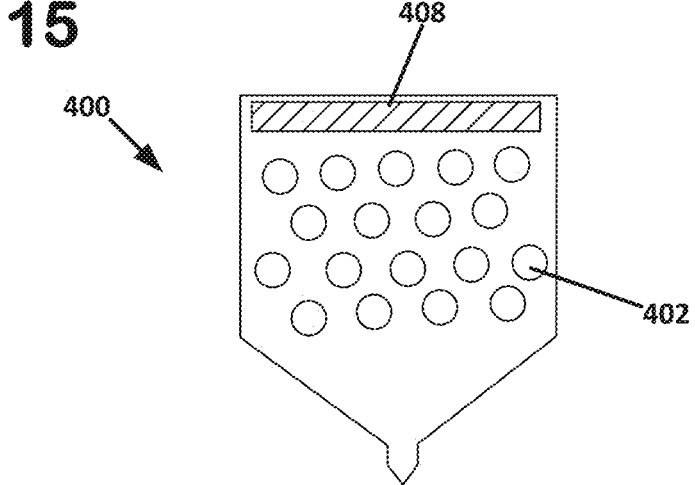
FIG. 15 is a schematic representation of a fourth example of a precleaner assembly in accordance with features of the present disclosure.

FIGS. 13-19 show additional examples of precleaner arrangements 400 and bypass arrangements 408. FIG. 13 shows a configuration in which a bypass arrangement 408 with a single bypass passageway 410 is provided, wherein the damper 412 is configured as a sliding gate. FIG. 14 shows a configuration in which multiple bypass arrangements 408 are provided with one bypass arrangement 408a having a shape corresponding to a circle sector and two bypass arrangements 408b, 408c having circular shapes, wherein gate-type dampers are also utilized. FIG. 15 shows a configuration in which a rectangular bypass arrangement 408 is provided. In this type of arrangement, a damper or sliding gate 412 can be provided.

Figure 16:
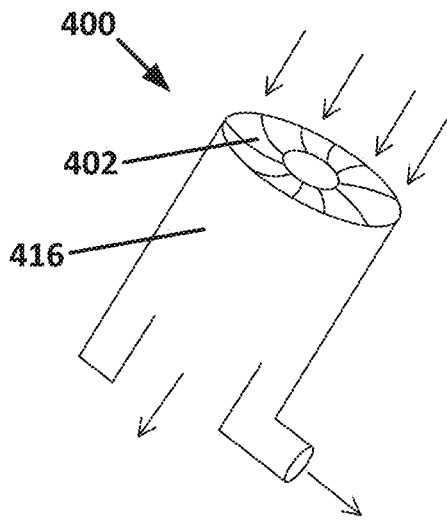
FIG. 16 is a schematic representation of an air cleaner with a fifth example of a precleaner assembly in accordance with features of the present disclosure with the precleaner assembly in a precleaning mode.
Figure 17:
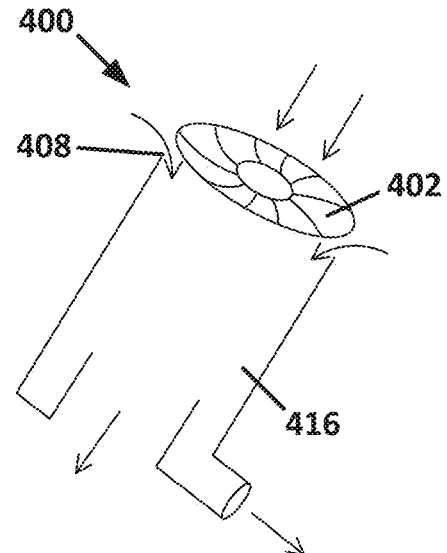
FIG. 17 is a schematic representation of the precleaner assembly shown in FIG. 16 in a bypass mode.
Figure 18:
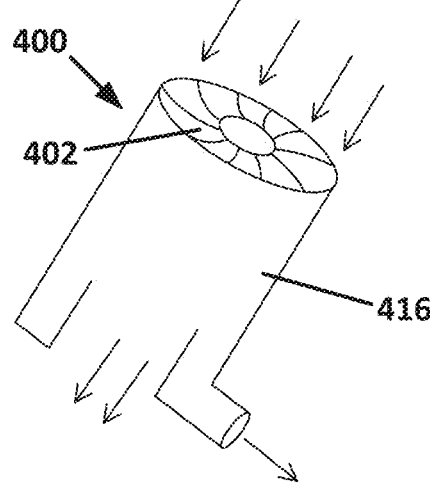
FIG. 18 is a schematic representation of an air cleaner with a sixth example of a precleaner assembly in accordance with features of the present disclosure with the precleaner assembly in a precleaning mode.
Figure 19:
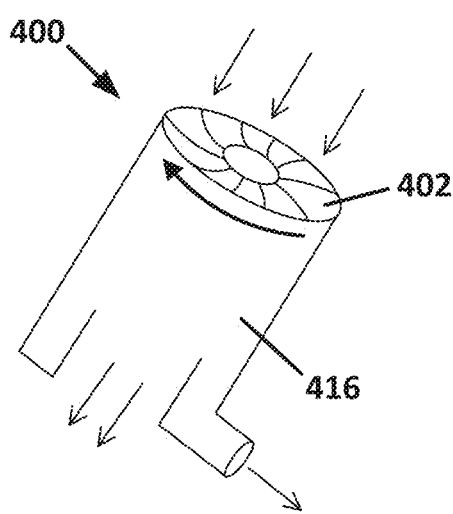
FIG. 19 is a schematic representation of the precleaner assembly shown in FIG. 18 in a bypass mode.

The embodiments shown at FIGS. 16-19 show precleaner arrangements 400 which utilizes a single-vane precleaner 402 rather than multiple separator tubes. A precleaner of this type is presented in U.S. Patent Application Ser. No. 62/673, 583 filed on May 18, 2018 and entitled PRECLEANER ARRANGEMENT FOR USE IN AIR FILTRATION METHODS, the entirety of which is incorporated by reference herein. With reference to FIG. 16, the precleaner 402 is inset within the sidewall 416 such that all air entering the interior space defined by the sidewall must first pass through the precleaner 402. With reference to FIG. 17, the precleaner 402 is moved axially such that an axial bypass space or gap 408 forms to allow air to enter the interior space defined by the sidewall 416 without first passing through the precleaner 402. An actuator can be provided to move the precleaner between the normal and bypass positions. In an alternative embodiment, a bypass damper or gate could be provided in the sidewall 416. FIGS. 18 and 19 show a similar precleaner assembly 400 with a single vane precleaner 402. However, in this embodiment, the precleaner 402 is configured to be rotatable with respect to the housing 416. As shown at FIG. 18, the precleaner 402 is locked from rotating such that all air passing through the precleaner 402 is directed in the usual manner to separate particulates. FIG. 19 shows a state in which the precleaner 402 is allowed to freely rotate. In this condition, the air flowing through the precleaner 402 is not subjected to the same degree of redirection by the precleaner vanes which simultaneously reduces the pressure drop through the precleaner 402 while also reducing precleaner efficiency to some degree. With such an arrangement, a clutch or brake can be used to prevent rotation of the precleaner 402. Other configurations are possible.

Media Types and Configurations

Any type of filter media can be used as the media pack for the filter cartridges 100, 200 in accordance with embodiments of the invention. For example, woven and non-woven materials using natural and/or synthetic fibers can be used to form fluted filter media, pleated media, and depth media. An exemplary configuration includes fluted filter media, such as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of filter media are provided in U.S. Pat. Nos. 5,820,646; 5,772,883; 5,902,364; 5,792,247; 5,895,574; 6,210,469; 6,190,432; 6,350,296; 6,179,890; 6,235,195; D399,944; D428,128; D396,098; D398,046; and D437,401, each of which is incorporated herein by reference.

One type of z-filter media utilizes two specific media components joined together to form the media construction. The two components include a fluted (typically corrugated) media sheet and a facing media sheet. The facing media sheet is typically non-corrugated, although it is possible for it to also be corrugated (e.g., perpendicular to the flute direction) as described in U.S. Provisional Application No. 60/543,804, filed Feb. 11, 2004, and published as PCT WO 05/077487 on Aug. 25, 2005, which is incorporated herein by reference.

The fluted media sheet and the facing media sheet are used together to define media having parallel inlet and outlet flutes. In some instances, the fluted sheet and facing sheet are secured together and are then coiled as a media strip to form a z-filter media construction. Such arrangements are described, for example, in U.S. Pat. Nos. 6,235,195 and 6,179,890, each of which is incorporated herein by reference.

In certain other arrangements, some non-coiled sections or strips of fluted (typically corrugated) media secured to facing media, are stacked with one another, to create a filter construction.

Corrugated media is a specific form of fluted media, wherein fluted media has individual flutes or ridges (for example formed by corrugating or folding) extending thereacross. The term "corrugated" is used herein to refer to structure in media, such as media having a flute structure resulting from passing the media between two corrugation rollers (e.g., into a nip or bite between two rollers, each of which has surface features appropriate to cause corrugations in the resulting media).

Serviceable filter element or filter cartridge configurations utilizing z-filter media are sometimes referred to as "straight through flow configurations" or by variants thereof. In general, serviceable filter elements or cartridges have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner.

It is noted that a plurality of embodiments are depicted and described. The embodiments are not meant to be exclusive with respect to features depicted. That is, selected features of one embodiment can be applied in one or more of the other embodiments if desired, to advantage. In many examples, the filter assembly depicted is an air cleaner assembly, for example, used to filter intake air for an internal combustion engine. Additional applications are possible, for example, applications in which the filter assembly is a crankcase ventilation filter assembly, in which the filter cartridge is used to filter crankcase blowby gases which include, typically, both particulate and liquid contaminant therein. Both type of filter assemblies are generally "gas filter assemblies," since the carrier stage being filtered is gas (air or crankcase ventilation gases). While the techniques described herein will typically be used in application for gas filtration, they can be used in the filtration of other materials, for example, liquids, if desired.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A precleaner assembly for an air cleaner assembly having a filter cartridge located downstream from the precleaner assembly, the precleaner assembly comprising:
   a) at least one particle separator tube including a vane arranged to direct air into cyclonic pattern; and
   b) a bypass arrangement operable between a first position and a second position:
      i) in the first position, an airflow stream flowing through the precleaner assembly flows, before the airflow stream is delivered to an inlet of the filter cartridge, in a first direction through one or both of the bypass arrangement and the at least one particle separator tube in a first proportional relationship without blocking flow through the at least one particle separator tube;
      ii) in the second position, the airflow stream flows, before the airflow stream is delivered to the inlet of the filter cartridge, in the first direction through one or both of the at least one particle separator tube and the bypass arrangement in a second proportional relationship different from the first proportional relationship without blocking flow through the at least one particle separator tube;
   c) an electronic controller configured to receive at least one input signal for controlling the bypass arrangement, wherein the at least one input signal corresponds to a parameter associated with one or more of: a vehicle or engine, a weather condition, a location, the airflow stream, the filter cartridge, the precleaner assembly, the air cleaner assembly, and a user input;
   d) wherein the airflow stream is received at the at least one particle separator tube and the bypass arrangement through a common air inlet; and
   e) wherein air flowing through a bypass passageway of the bypass arrangement flows in a direction that is parallel to a direction of air flowing through the at least one particle separator tube at least when the bypass arrangement is in a fully open position.

2. The precleaner assembly of claim 1, wherein the second proportional relationship associated with the bypass arrangement second position includes the airflow stream flowing through the at least one particle separator tube at a higher proportion in comparison to air flowing through the bypass arrangement first position.

3. The precleaner assembly of claim 1, wherein the bypass arrangement includes one or more apertures disposed within a partition wall.

4. The precleaner assembly of claim 1, wherein the bypass arrangement includes a damper or gate controlled by an actuator.

5. The precleaner assembly of claim 4, wherein the electronic controller operates the actuator.

6. The precleaner assembly of claim 5, wherein the electronic controller receives at least one input for controlling the position of the damper via the actuator, wherein the at least one input signal corresponds to one or more of: a vehicle speed, an engine speed, an engine load, an operator input, a vehicle location, an air pressure drop across the filter cartridge, an air pressure drop across the precleaner assembly, an acoustic level, a mass airflow rate through the precleaner assembly or through the filter cartridge, a weather condition, a parameter identified through data received locally or from a weather service, a presence of moisture or water, a vehicle or engine vibration, a filter change frequency or a total number of filter changes, a filter identity, and an engine or vehicle identity.

7. A precleaner assembly for an air cleaner assembly having a filter cartridge located downstream from the precleaner assembly, the precleaner assembly comprising:
   a) at least one particle separator tube including a vane arranged to direct air into cyclonic pattern;
   b) a bypass arrangement operable between a first position and a second position:
      i) in the first position, an airflow stream flowing through the precleaner assembly flows, before the airflow stream is delivered to an inlet of the filter cartridge, in a first direction through one or both of the bypass arrangement and the at least one particle separator tube in a first proportional relationship without blocking flow through the at least one particle separator tube;

ii) in the second position, the airflow stream flows, before the airflow stream is delivered to an inlet of the filter cartridge, in the first direction through one or both of the at least one particle separator tube and the bypass arrangement at a second proportional relationship different from the first proportional relationship without blocking flow through the at least one particle separator tube;

c) an actuator for operating the bypass arrangement between the first and second positions; and d) an electronic controller for operating the actuator, the electronic controller operating the actuator based on an operational parameter of a vehicle within which the precleaner assembly is installed, the operational parameter being associated with one or more of: a vehicle or engine, a weather condition, a location, the airflow stream, the filter cartridge, the precleaner assembly, the air cleaner assembly, and a user input;

e) wherein the airflow stream is received at the at least one particle separator tube and a bypass passageway of the bypass arrangement through a common air inlet opening such that air flowing through the bypass passageway is in parallel to air flowing through the at least one particle separator tube at least when the bypass arrangement is in a fully open position.

8. The precleaner assembly of claim 7, wherein the operational parameter is one or more of a sensed dust condition in the airflow stream, a GPS position location of the vehicle, a sensed pressure drop of the airflow stream across the precleaner assembly, a dust-removal efficiency of the precleaner assembly, and an airflow volume of the airflow stream passing through the precleaner assembly.

9. The precleaner assembly of claim 7, wherein the electronic controller commands the actuator to close the bypass arrangement in the second position such that no air flows through the bypass arrangement when a threshold value of the operational parameter is exceeded.

10. The precleaner assembly of claim 7, wherein the electronic controller commands the actuator to partially close the bypass arrangement in the second position such that a reduced airflow flows through the bypass arrangement in comparison to the first position.

11. The precleaner assembly of claim 7, wherein the bypass arrangement includes a damper or gate for controlling airflow through the bypass arrangement, the damper or gate being operated by the actuator.

12. The precleaner assembly of claim 11, wherein the electronic controller receives at least one input for controlling the position of the damper via the actuator, wherein the at least one input corresponds to one or more of: a vehicle speed, an engine speed, an engine load, an operator input, a vehicle location, an air pressure drop across the filter cartridge, an air pressure drop across the precleaner assembly, an acoustic level, a mass airflow rate through the precleaner assembly or through the filter cartridge, a weather condition, a parameter identified through data received locally or from a weather service, a presence of moisture or water, a vehicle or engine vibration, a filter change frequency or a total number of filter changes, a filter identity, and an engine or vehicle identity.

13. The precleaner assembly of claim 7, wherein air flowing through the bypass arrangement flows in a direction that is parallel to a direction of air flowing through the at least one particle separator tube.

14. An air cleaner assembly comprising:

a) a housing body having an inlet end and an outlet end, the housing body defining an interior cavity;

b) a filter cartridge disposed within the interior cavity;

c) a precleaner assembly mounted to the inlet end of the housing body at a location upstream of the filter cartridge, the precleaner assembly including:

i) a partition wall;

ii) a plurality of separator tubes supported by and extending through the partition wall, each of the plurality of separator tubes including a vane arranged to direct air into cyclonic pattern;

d) a bypass arrangement adjacent the plurality of separator tubes and upstream of the filter media, the bypass arrangement being operable between a first position and a second position:

i) in the first position, an airflow stream flowing through the precleaner assembly flows in a first direction through one or both of the bypass arrangement and the plurality of separator tubes in a first proportional relationship without blocking flow through the plurality of separator tubes;

ii) in the second position, the airflow stream flows in the first direction through one or both of the plurality of separator tubes and the bypass arrangement in a second proportional relationship different from the first proportional relationship without blocking flow through the plurality of separator tubes; and e) an electronic controller configured to receive at least one input signal for controlling the bypass arrangement, wherein the at least one input signal corresponds to a parameter associated with one or more of: a vehicle or engine, a weather condition, a location, the airflow stream, the filter cartridge, the precleaner assembly, the air cleaner assembly, and a user input; and f) wherein air flowing through a bypass passageway of the bypass arrangement flows in a direction that is parallel to a direction of air flowing through each of the plurality of separator tubes and is parallel to a direction of air flowing through the filter cartridge.

15. The air cleaner assembly of claim 14, wherein the second proportional relationship associated with the bypass arrangement second position includes the airflow stream flowing through the plurality of separator tubes at a higher proportion relative to air flowing through the bypass arrangement first position.

16. The air cleaner assembly of claim 15, wherein the bypass arrangement includes one or more apertures disposed within the partition wall.

17. The air cleaner assembly of claim 14, wherein the bypass arrangement includes a damper or gate for controlling flow through the bypass arrangement.

18. The air cleaner assembly of claim 17, wherein the at least one input signal corresponds to one or more of: a vehicle speed, an engine speed, an engine load, an operator input, a vehicle location, an air pressure drop across the filter cartridge, an air pressure drop across the precleaner assembly, an acoustic level, a mass airflow rate through the precleaner assembly or through the filter cartridge, a weather condition, a parameter identified through data received locally or from a weather service, a presence of moisture or water, a vehicle or engine vibration, a filter change frequency or a total number of filter changes, a filter identity, and an engine or vehicle identity.

* * * * *